United States Patent [19]

Hobbs

[11] Patent Number: 4,911,531
[45] Date of Patent: Mar. 27, 1990

[54] OPTICAL CORRELATOR SYSTEM

[75] Inventor: Douglas S. Hobbs, Chelmsford, Mass.

[73] Assignee: Grumman Aerospace Corporation, Bethpage, N.Y.

[21] Appl. No.: 236,518

[22] Filed: Aug. 25, 1988

[51] Int. Cl.⁴ .......................... G02B 5/32; G03H 1/26; G06K 9/80

[52] U.S. Cl. ................. 350/162.13; 350/3.7; 350/3.73

[58] Field of Search ................. 350/162.13, 3.7, 3.73, 350/3.82, 3.81, 3.77, 3.6

[56] References Cited

U.S. PATENT DOCUMENTS

| | | | |
|---|---|---|---|
| 3,403,261 | 9/1968 | Bowers et al. | 250/219 |
| 3,602,887 | 8/1971 | Chow | 350/162.13 |
| 3,635,538 | 1/1972 | Caulfield et al. | 350/3.5 |
| 3,669,521 | 6/1972 | Tait | 350/3.5 |
| 3,751,132 | 8/1973 | Croh | 350/3.5 |
| 3,779,492 | 12/1973 | Grumet | 244/3.17 |
| 3,903,400 | 9/1975 | Nisenson | 235/152 |
| 3,905,019 | 9/1975 | Aoki et al. | 340/146.3 |
| 3,941,450 | 3/1976 | Spitz et al. | 350/3.73 |
| 4,076,370 | 2/1978 | Wako | 350/3.75 |
| 4,421,379 | 12/1983 | Grumet et al. | 350/3.72 |
| 4,703,994 | 11/1987 | Leib et al. | 350/3.75 |

OTHER PUBLICATIONS

"Stacked Optical Memories," by D. Pohl, *Applied Optics*, vol. 13, No. 2, Feb. 1974, pp. 341–346.
"Multiple Hologram Readout," by J. B. Tait, IBM Technical Disclosure Bulletin, vol. II, No. II, Apr. 1969, p. 1391.
"Multiple Hologram Readout to Single Diode Array," by J. B. Tait, et al., IBM Technical Disclosure Bulletin, vol. II, No. 12, May 1969, p. 1636.

*Primary Examiner*—Rodney B. Bovernick
*Assistant Examiner*—Terry S. Callaghan
*Attorney, Agent, or Firm*—Scully, Scott, Murphy & Presser

[57] ABSTRACT

An optical correlator system comprising a laser to generate a signal beam, a film to spatially modulate that beam, and a beam splitter to split the signal beam into two component beams. The first component beam is directed onto a first side of a multiple holographic lens, which generates from the component beam a first matrix of individually converging beams and a second matrix of individually diverging beams. The second component beam is directed onto a second side of the holographic lens, which generates from this component beam a third matrix of individually converging beams and a fourth matrix of individually diverging beams. The beams of the first and third matrices are focused by the holographic lens onto first and second matched filters, respectively, and correcting optical elements are used to focus the beams of the second and fourth matrices onto third and fourth matched filters, respectively.

12 Claims, 2 Drawing Sheets

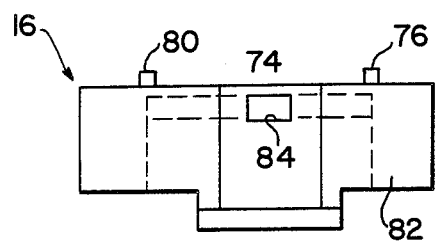
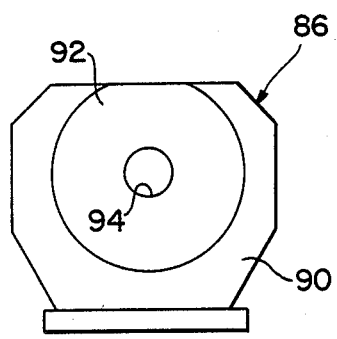
FIG. 4        FIG. 5
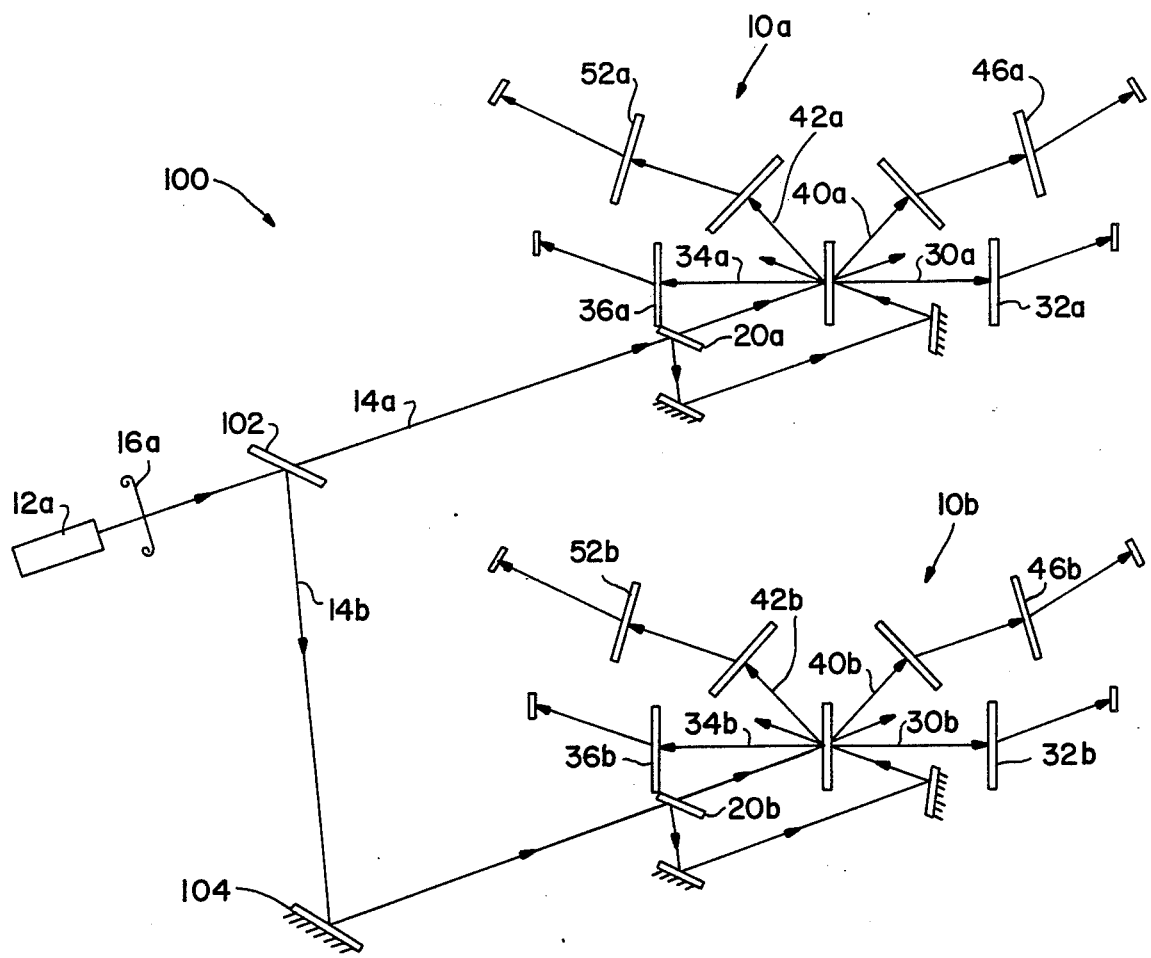
FIG. 6

OPTICAL CORRELATOR SYSTEM

BACKGROUND OF THE INVENTION

This invention generally relates to optical correlator systems; and more specifically, to multiple channel optical correlator systems.

Optical correlator systems are used to detect the presence of a selected target in a scene or a field of view. In an optical correlator system, a coherent light beam is passed through a view or scene, which may include the selected target, and then transmitted through a matched filter. The matched filter contains a recording of a diffraction pattern unique to the selected target; and if the selected target is present in the submitted view, the matched filter redirects a portion of the beam incident on it into a relatively intense output beam at a selected angle relative to the incident beam, and an inverse transform lens brings this output beam from the matched filter to a focus. However, if the selected target is not present in the submitted view, any output beam of the matched filter at this selected angle is relatively weak and diffused. A light sensitive detector is located in the focal plane of the inverse transform lens; and when light of a sufficient intensity is focused on that detector, an output signal is produced. This output signal is used to trigger some type of device, which, depending on the apparatus in which the target recognition system is used, might be a simple alarm or a complex robotic guidance system, for example.

The capacity of an optical correlator system can be significantly increased by providing the system with a matched filter having a multitude of recorded diffraction patterns. This multi-channel memory can be addressed by a multiple focus holographic lens, or MHL, which can replicate and Fourier transform an input image. Each of the diffraction patterns stored in the memory may be unique to a respective view of one target, or these diffraction patterns may represent plural targets, and a correlator system having a multitude of such diffraction patterns may be used to detect a target in a scene independent of the orientation of the target in that scene, or to detect plural targets in one scene.

In order to improve the response time and the storage capacity of a correlator system having a multitude of recorded diffraction patterns, commonly the modulated signal beam is replicated manifold, and each replica beam is focused on a respective one of the recorded diffraction patterns. Various prior art techniques are known to replicate the modulated signal beam, and, for example, a multiple beam generating holographic element may be used for this purpose. While these prior art arrangements are normally satisfactory, it is nonetheless believed that their efficiency can be improved. In particular, while these multichannel correlator systems have increased capacity relative to conventional single channel systems, it is nonetheless believed that the capacity of multichannel systems can be further increased without significantly increasing either the size or the cost of the systems.

SUMMARY OF THE INVENTION

An object of this invention is to use a single multiple focus holographic lens to produce four multi-channel output beams, thereby quadrupling the capacity of a multi-channel correlator system.

Another object of the present invention is to pass a signal beam twice through a multiple focus holographic lens to produce an array of converging replica beams and an array of diverging replica beams, and to use these beams to address each one of four matched filter memory elements.

A further object of this invention is to arrange a group of optical correlator systems in a cascade, where the signal beams of all of the systems are derived from one source beam, and with each of the systems employing one MHL to address four matched filer arrays.

These and other objectives are attained with an optical correlator system, comprising means for generating a collimated electromagnetic signal beam, image means located in the path of the signal beam to spatially modulate that beam, first and second matched filters, each of which has a plurality of optical memories, and a beamsplitter located in the path of the signal beam to split that beam into first and second components and to direct these components onto first and second paths respectively. The first component of the signal beam is directed onto a first side of the multiple beam generating holographic lens, and this lens generates a first matrix of individually converging beams. Each beam of this first matrix is spatially modulated identically to the first component of the signal beam, and is focused on a respective one of the optical memories of the first matched filter. The second component of the signal beam is directed onto a second, opposite side of the multiple holographic lens, and this lens generates a second matrix of individually converging beams. Each beam of this second matrix is spatially modulated identically to the second component of the signal beam, and is focused on a respective one of the optical memories of the second matched filter. Optical detection means are located in the paths of output beams of the first and second matched filters to generate a signal when the correlation between the pattern of one of the beams focused on the matched filters and the optical memory on which said one of the beams is focused, rises above a predetermined threshold.

As the first component of the signal beam passes through the multiple holographic lens, that lens also produces a third matrix of individually diverging beams, with each beam of this matrix being spatially modulated identically to the first component of the signal beam; and as the second component of the signal beam passes through the multiple holographic lens, the lens produces a fourth matrix of individually diverging beams, with each beam of this matrix being spatially modulated identically to the second component of the signal beam. Preferably, the system further includes third and fourth matched filters, each of which has a plurality of optical memories. A first correcting optical element is located in the path of the third matrix of diverging beams to correct the distortion and astigmatism in these beams, and to focus each beam of this third matrix onto a respective one of the optical memories of the third matched filter. A second correcting optical element is located in the path of the fourth matrix of beams to correct the distortion and astigmatism in these beams, and to focus each beam of that matrix onto a respective one of the optical memories of the fourth matched filter. With this preferred arrangement, the optical detection means is also located in the paths of output beams of the third and fourth matched filters to generate a signal when the correlation between the pattern of one of the beams focused on one of those filters and the optical memory on which said one of the beams is focused, rises above a predetermined value.

A plurality of systems as described above may be arranged in a cascade, with the signal beams of all of the systems being derived from one source beam, and with each of the systems employing one multiple beam generating holographic lens to produce four matrices of beams, with each of these matrices being focused on the optical memories of a respective matched filter.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIGS. 4 and 5 are simplified front views of imaging means that may be used in the system of FIG. 1.

FIG. 6 is a schematic diagram of an optical correlator system according to a second embodiment of the present invention.

DETAILED DESCRIPTION OF THE PREFERRED EMBODIMENTS

Figure 1:
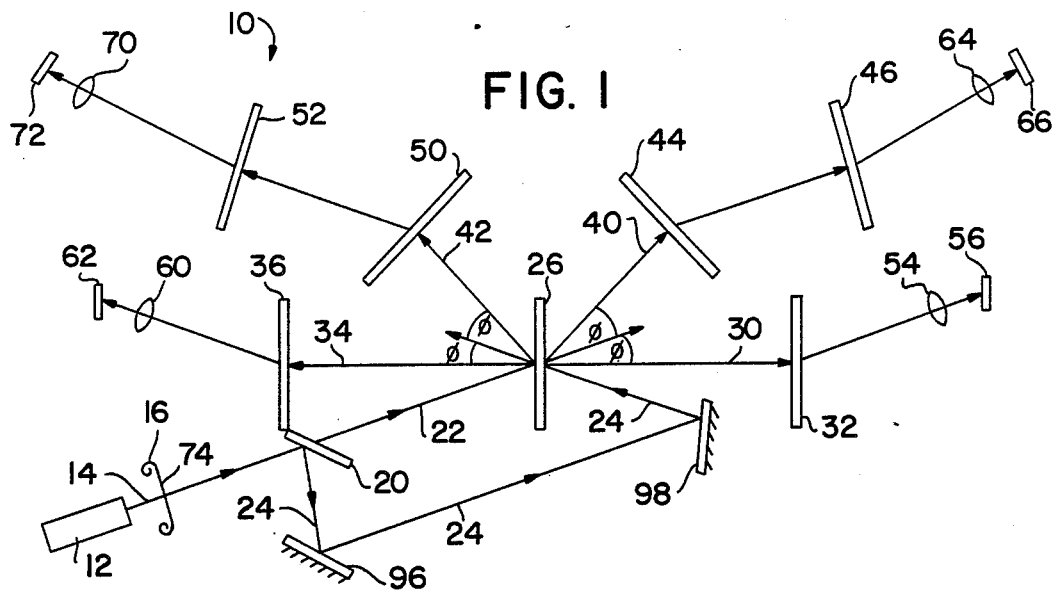
FIG. 1 is a schematic drawing of an optical correlator system according to the present invention.

FIG. 1 shows system 10, in which a source of monochromatic collimated electromagnetic energy of substantially fixed wavelength such as laser 12 produces an output beam 14, referred to as the source or signal beam, and directs that output beam through imaging means 16 and beam splitter 20. Imaging means 16 is used to expose to the signal beam one or more scenes suspected of having one or more selected targets; and as the signal beam passes through the scene on the imaging means, the signal beam becomes amplitude modulated with the imagery on that scene.

Figure 2:
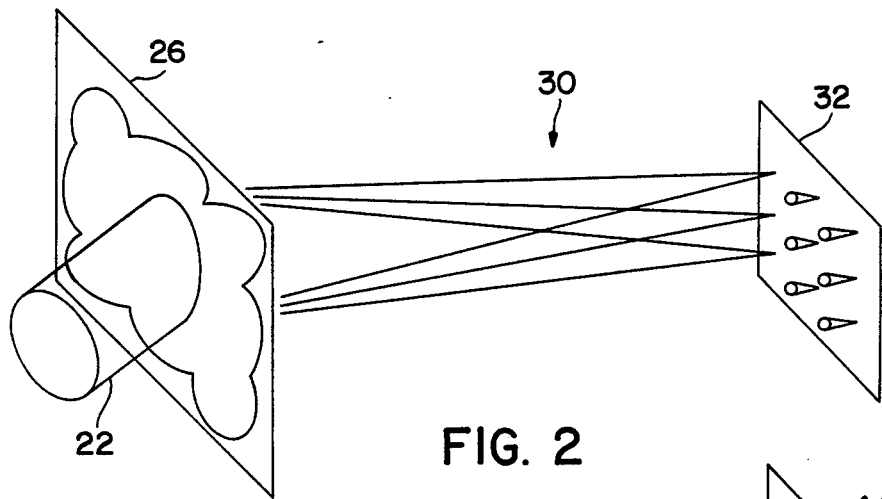
FIG. 2 is an enlarged view of a portion of the system of FIG. 1, schematically showing in detail one matrix of output beams of the multiple holographic lens of that system.

Beam splitter 20 splits the modulated signal beam into identical, first and second output beams 22 and 24, each of which is spatially modulated in a manner identical to the modulated output beam 14 from imaging means 16; and beams 22 and 24 are subsequently directed onto first and second sides, respectively, of multiple beam generating holographic lens 26. From beam 22, lens 26 generates a series or matrix of beams, generally represented at 30, at an angle $\theta$ to the axis of the incident beam 22, which are focused onto matched filter 32. Each beam of matrix 30 is spatially modulated in the same way as beam 22 and is referred to as a real image, this matrix is referred to as a first order output matrix of lens 26. With reference to FIG. 2, each beam of matrix 30 converges inwardly toward a point or focal area as the beam passes away from lens 26, and the individual beams of matrix 30 have substantially parallel axes and are focused on different areas of matched filter 32. For purposes of illustrating the present invention, the output of holographic lens 26 is shown in FIG. 2 to be a 3 by 3 matrix of identical beams, but this is not to be considered as a limitation of the invention.

Similarly, lens 26 generates from beam 24 another series or matrix of beams, generally represented at 34, which are focused onto matched filter 36 and at an angle $\theta$ to the axis of the incident beam 24. Each beam of matrix 34 is spatially modulated in the same way as beam 24 and also is referred to as a real image, and this matrix also is referred to as a first order output matrix of lens 26. Similar to the beams of matrix 30 shown in FIG. 2, each beam of matrix 34 converges inwardly toward a point or focal area as the beam passes away from lens 26, and the individual beams of matrix 34 have substantially parallel axes and are focused on different areas of matched filter 36.

Figure 3:
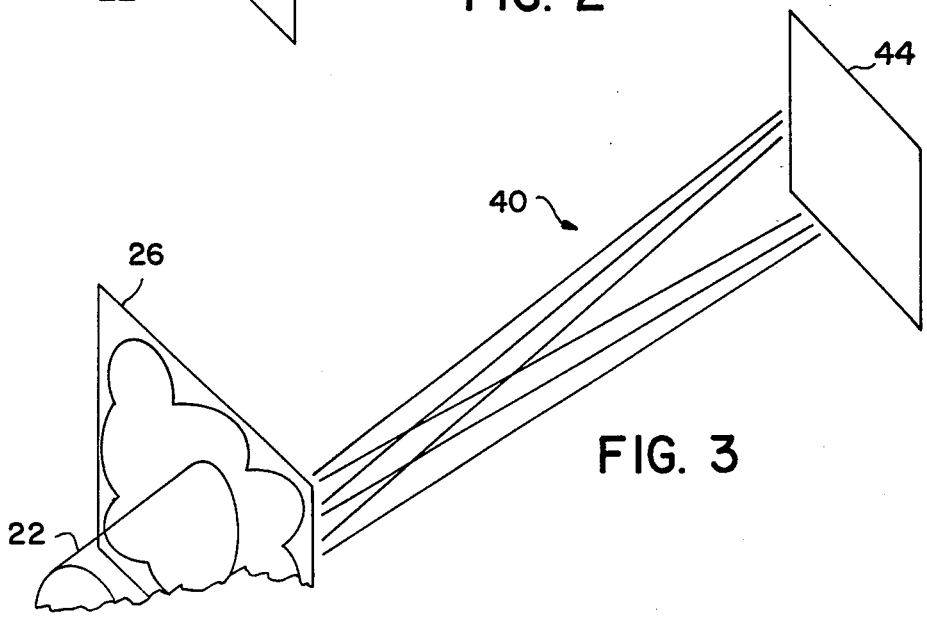
FIG. 3 also is an enlarged view of a portion of FIG. 1, schematically showing in detail a second matrix of output beams of the multiple holographic lens.

Lens 26 also produces a second order output matrix of beams from each of the beams 22 and 24 incident on the lens and at an angle $\phi$ relative to the axis of that incident beam. The second order matrix produced from beam 22 is generally represented at 40 in FIG. 1, while the second order matrix of beams produced from incident beam 24 is generally represented at 42 in FIG. 1. Each beam of matrix 40 is spatially modulated in the same way as incident beam 22, and each beam of matrix 42 is spatially modulated in the same way as beam 24. As shown in FIG. 3, each beam of matrix 40 diverges outwardly as the beam moves away from lens 26, and the individual beams of matrix 40 have substantially parallel axes; and, similarly, each beam of matrix 42 diverges outwardly as the beam moves away from lens 26, and the individual beams of matrix 42 have substantially parallel axes. The beams of these second order output matrices are referred to as virtual images and are out of phase with respect to the incident beams from which they are generated.

The beams of matrix 40 are directed through optical element 44, which corrects the phase error or astigmatism of these beams and focuses these beams on matched filter 46. Likewise, the beams of matrix 42 are directed to optical element 50, which corrects the phase error or astigmatism of these beams and focuses these beams on matched filter 52. Preferably, optical elements 44 and 50 are holographic lenses.

Holographic lens 26 performs a Fourier transform of all the imagery on the scene exposed to the signal beam by imaging means 16. Each of the beams of matrices 30 and 34 is a first order component of holographic lens 26, and each of the beams of matrices 40 and 42 is a second order component of the holographic lens, and these multiple beams constitute many replicas of the diffraction patterns of all the imagery on the input scene exposed to the signal beam.

A multitude of diffraction patterns, referred to as optical memories, are recorded in each of matched filters 32, 36, 46 and 52, and each of these diffraction patterns represents a view of the suspected target or targets. Each beam of matrix 30 is focused on and passes through a respective one of the optical memories recorded in the matched filter 32, and each beam of matrix 34 is focused on and passes through a respective diffraction pattern recorded in filter 36. Similarly, each beam of matrix 40 is directed by optical element 44 onto, and passes through, a respective one of the optical memories recorded in the matched filter 46 and each beam of matrix 42 is directed by lens 50 onto, and passes through, a respective one of the optical memories recorded in the matched filter 52. Optical detection means, preferably comprising inverse transform lenses 54, 60, 64 and 70 and photodetectors 56, 62, 66 and 72, is located in the paths of output beams of matched filters 32, 36, 46 and 52 to generate a signal when the correlation between the pattern of one of the beams focused on the matched filters and the optical memory on which that one of the beams is focused, rises above a predetermined value.

If the target view represented by a particular diffraction pattern recorded in one of the matched filters 32, 36, 46 and 52 is present in the scene exposed to signal beam 14 at imaging means 16, then the matched filter having that diffraction pattern redirects a portion of the beam passing through that particular diffraction pattern into a relatively intense output beam at a selected angle relative to the incident beam; and if this happens, the associated inverse transform lens focuses that matched filter output beam onto the associated detector, triggering an alarm signal. In particular, if the pattern of one of the beams incident on matched filter 32 correlates with the diffraction pattern through which that one beam passes, the matched filter redirects a portion of this incident beam onto inverse transform lens 54, which focuses that output beam of the matched filter on detector 56; and if the pattern of one of the beams incident on matched filter 36 correlates with the diffraction pattern through which that one beam passes, the matched filter redirects a portion of this incident beam onto inverse transform lens 60, which focuses that matched filter output beam on detector 62. Similarly, if the pattern of one of the beams incident on matched filter 46 correlates with the diffraction pattern through which that one beam passes, the matched filter redirects a portion of this incident beam onto inverse transform lens 64, which focuses that output beam of the matched filter onto detector 66; and if the pattern of one of the beams incident on matched filter 52 correlates with the diffraction pattern through which that beam passes, the matched filter redirects a portion of this incident beam onto inverse transform lens 70, which focuses that output beam of the matched filter onto detector 72.

If none of the target views represented by the diffraction patterns of matched filters 32, 36, 46 and 52 is present in the scene exposed to the signal beam 14 by imaging means 16, then any output beams of the matched filters are all relatively weak and diffused. Any of these beams that pass through lenses 54, 60, 64 and 70 remain weak and diffused, and the beams do not activate detectors 56, 62, 66 or 72 to trigger the associated alarms.

Laser 12 preferably is of the gaseous type such as an argon ion laser producing a continuous output at a wavelength near 5000 angstroms, but suitable lasers of other types, such as a semiconductor type, an yttrium aluminum garnet (YAG) or a helium-neon continuous wave laser, a carbon dioxide laser or a pulsed laser can also be employed in system 10.

Various types of imaging means 16 may be used in system 10; and for example, as represented in FIGS. 1 and 4, the imaging means may comprise a film 74 connected to a pair of spaced spools or rollers 76 and 80. Initially, the film is wound around first spool 76, and in use, any suitable drive means (not shown) is connected to second spool 80 to rotate that spool and advance the film transversely in a plurality of discrete steps across the path of signal beam 14. The film and rollers may be housed in a liquid gate 82 having a pair of aligned windows (one of which is shown at 84 in FIG. 4) positioned to allow the signal beam 14 to pass through the housing and to expose the film therein to that signal beam.

Alternatively, with reference to FIG. 5, the imaging means may comprise a rotating liquid gate 86 including a stationary frame 90 and rotatable plate 92 internal to the frame. Plate 92 includes a central opening or window 94 for holding a picture of a selected view or object, and the plate 92 is supported by frame 90 for rotation abut the axis of that central opening. A stepper motor (not shown) is supported by frame 90 and connected to plate 92 by any suitable drive mechanism (also not shown) to rotate the plate, and thus the picture held in opening 94, about the axis of that opening, through a plurality of discrete annular steps. Rotatable linear gates are also known in the art and may be used in the practice of this invention.

With the preferred embodiment of system 10 illustrated in FIG. 1, beams 22 and 24 are incident on lens 26 at equal angles relative to the axis of that lens. Moreover, preferably, lens 26 is located on the axis onto which beam 22 is directed by beam splitter 20, and a pair of mirrors 96 and 98 are positioned to direct beam 24 from the beam splitter and onto the multiple holographic lens 26. As illustrated in FIG. 1, imaging means 16 is located in the path of signal beam 14, between beam generator 12 and beam splitter 20, to spatially modulate the signal beam before it is split by the beam splitter. Alternatively, a pair of imaging means, one located along the path of beam 22 and one located along the path of beam 24, may be used to spatially modulate those beams. With either arrangement, beam expansion means (not shown) may be used to insure that the complete area of the image to which beam 14 or beams 22 and 24 is exposed, is illuminated by the beam passing through the image.

FIG. 6 illustrates a second embodiment of the present invention, generally comprising a plurality of system 10 as described above, arranged in a cascade. The multi-system embodiment of FIG. 6 is generally identified by the reference number 100; and a first of the component systems of multi-system 100 is identified by the reference number 10a, and elements of this system are identified by the same reference number used to identify the element in FIG. 1, but with the added suffix "a". The second system of multi-system arrangement 100 is identified by the reference number 10b, and elements of this system are identified by the same reference number used to identify the corresponding element in FIG. 1, but with the added suffix "b".

With arrangement 100, an additional beam splitter 102 is located between imaging means 16a and beam splitter 20a to split the signal beam from laser 12a into two identical beams 14a and 14b. A first beam 14a is conducted to beam splitter 20a and, in the manner discussed above, is used to produce four matrices of replica beams 30a, 34a, 40a and 42a with each of these matrices of beams being focused on a respective matched filter 32a, 36a, 40a and and 42a. The second beam 14b from element 102 is used as the signal beam of system 10b; and, in particular, this component of the signal beam is directed to beam splitter 20b of system 10b by mirror 104, and is directed through system 10b in the same way signal beam 14 is directed through system 10, producing four matrices of beams 30b, 34b, 40b and 42b, with each of these matrices of beams being focused on a respective matched filter 32b, 36b, 40b and and 42b.

As will be understood by those of ordinary skill in the art, embodiment 100 of FIG. 6 may be expanded without departing from the scope of the present invention to include more than two component systems 10a and 10b, and these component systems may be arranged in parallel or in series. For instance, to add another component to apparatus 100, a beam splitter (not shown) may be located between mirror 104 and beam splitter 20b to split beam 14b into two components, with a first of these components being directed through system 10b, and a second of these components being directed through a third component system. Alternatively, a beam splitter (not shown) may be located between beam splitter 102 and mirror 104 to split beam 14b into two components, prior to that beam striking mirror 104. A first of these components would be directed to mirror 104 and then through system 10b, while a second of these component beam would be directed through a third system. The limit of the number of component systems that may be employed in apparatus 100 is determined principally by the strength of the beam from laser 12a and the extent to which that signal is attenuated by the optical elements placed in its path.

Any suitable optical detectors may be used in the practice of the present invention. For instance, each detector of system 10 or 100 may comprise a single photosensitive cell positioned so that all of the light beams passing through the associated inverse transform lens and matched filter are incident on the photosensitive cell. Alternatively, each detector may comprise an array of photosensitive cells, with each of these cells positioned so that a respective one, or more, of the light beams passing through the associated inverse transform lens and matched filter is incident on the photosensitive cell. In addition, as will be understood by those of ordinary skill in the art, optical lenses could be used instead of holographic lenses 44 and 50 to focus the beams of matrices 40 and 42 on filters 46 and 52 respectively. Holographic lenses are normally preferred, however, because they are relatively small, light and inexpensive.

Similarly, any suitable multiple beam generating holographic lenses, mirrors, beam splitters, matched filters and inverse transform lenses may be used in systems 10 and 100. Numerous such devices are well known in the art, and it is unnecessary to describe these devices in detail herein. For example, U.S. Pat. No. 4,703,994 describes one procedure to make a matched filter having an array of optical memories; and U.S. Pat. No. 4,421,879 discloses a process for making a multiple beam generating holographic lens.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. An optical correlator system, comprising:
   means for generating a collimated signal beam;
   image means located in the path of the signal beam to spatially modulate the signal beam;
   first and second matched filters, each of the matched filters having a plurality of optical memories;
   a beam splitter located in the path of the signal beam to split the signal beam into first and second components and to direct the first and second components of the signal beam onto first and second paths respectively;
   a multiple beam generating holographic lens having first and second opposite sides; the first side of the multiple beam generating holographic lens being located in the path of the first component of the signal beam, wherein the multiple beam generating holographic lens generates a first matrix of spatially modulated, individually converging beams focused onto the first matched filter; and the second side of the multiple beam generating holographic lens being located in the path of the second component of the signal beam, wherein the multiple beam generating holographic lens generates a second matrix of spatially modulated, individually converging beams focused onto the second matched filter; each beam of the first matrix being focused on a respective one of the optical memories of the first matched filter, and each beam of the second matrix being focused on a respective one of the optical memories of the second matched filter; and
   optical detection means located in the paths of output beams of the first and second matched filters to generate a signal when the correlation between the pattern of one of the beams focused on the matched filters and the optical memory on which said one of the beams is focused, rises above a predetermined value.

2. An optical correlator system according to claim 1, wherein:
   the multiple beam generating holographic lens generates a third matrix of individually diverging beams, each beam of said third matrix being spatially modulated identically to the first component of the signal beam;
   the system further includes
   (i) a third matched filter having a plurality of optical memories, and
   (ii) a first correcting optical element located in the path of the third matrix of beams to focus each beam of said third matrix onto a respective one of the optical memories of the third matched filter; and
   the optical detection means is also located in the paths of output beams of the third matched filter to generate a signal when the correlation between the pattern of one of the beams focused on the third matched filter and the optical memory on which said one of the beams is focused, rises above a predetermined value.

3. An optical correlator system according to claim 2, wherein:
   the multiple beam generating lens defines an axis;
   the first component of the signal beam is incident on the first side of the multiple beam generating holographic lens at a given angle relative to said axis; and
   the second component of the signal beam is incident on the second side of the multiple beam generating holographic lens at said given angle relative to said axis.

4. An optical correlator system according to claim 3, wherein:
   the beam splitter directs the first component of the signal beam onto a first axis, and directs the second component of the signal beam onto a second axis;
   the multiple beam generating holographic lens is located on said first axis; and
   the correlator system further includes first and second mirrors, the first mirror being located on the second axis to reflect the second component of the signal beam onto a third axis, the second mirror being located on the third axis to reflect the second component of the signal beam onto the multiple beam generating holographic lens.

5. An optical correlator system according to claim 4, wherein the imaging means is located between the beam generator and the beam splitter to spatially modulate the signal beam before the signal beam is split into said first and second components.

6. An optical correlator system according to claim 5, wherein:
the multiple beam generating holographic lens generates a fourth matrix of individually diverging beams, each beam of said fourth matrix being spatially modulated identically to the second component of the signal beam;
the system further includes
(i) a fourth matched filter having a plurality of optical memories, and
(ii) a second correcting optical element located in the path of the fourth matrix of beam to focus each beam of said fourth matrix onto a respective one of the optical memories of the fourth matched filter; and
the optical detection means is also located in the paths of output beams of the fourth matched filter to generate a signal when the correlation between the pattern of one of the beams focused on the fourth matched filter and the optical memory on which said one of the beams is focused, rises above a predetermined value.

7. An optical correlator system according to claim 6, wherein each beam of the first matrix is spatially modulated identically to the first component of the signal beam, and each beam of the second matrix is spatially modulated identically to the second component of the signal beam.

8. An optical correlator system according to claim 6, wherein the first and second correcting optical elements are first and second holographic lenses respectively.

9. An optical correlator system, comprising:
means for generating a collimated signal beam;
image means located in the path of the signal beam to spatially modulate the signal beam;
first, second, third and fourth matched filters, each of the matched filters having a plurality of optical memories;
a first beam splitter located in the path of the signal beam to split the signal beam into first and second components and to direct the first and second components of the signal beam onto first and second paths respectively;
a second beam splitter located in the path of said first component to split said first component beam into third and fourth components and to direct the third and fourth components of the signal beam onto third and fourth paths respectively;
a first multiple beam generating holographic lens having first and second opposite sides; the first side of the multiple beam generating holographic lens being located in the path of the third component of the signal beam, wherein the multiple beam generating holographic lens generates a first matrix of spatially modulated individually converging beams focused onto the first matched filter, and wherein the multiple beam generating holographic lens generates a second matrix of spatially modulated, individually diverging beams; and the second side of the multiple beam generating holographic lens being located in the path of the fourth component of the signal beam, wherein the multiple beam generating holographic lens generates a third matrix of spatially modulated, converging beams focused onto the second matched filter, and wherein the multiple beam generating holographic lens generates a fourth matrix of spatially modulated, individually diverging beams; each beam of the first matrix being focused on a respective one of the optical memories of the first matched filter, and each beam of the third matrix being focused on a respective one of the optical memories of the third matched filter;
a first correcting optical element located in the path of the second matrix of beams to focus each beam of said second matrix onto a respective one of the optical memories of the third matched filter;
a second correcting optical element located in the path of the fourth matrix of beams to focus each beam of said fourth matrix onto a respective one of the optical memories of the fourth matched filter;
first optical detection means located in the paths of output beams of the first, second, third and fourth matched filters to generate a signal when the correlation between the pattern of one of the beams focused on the matched filters and the optical memory on which said one of the beams is focused, rises above a predetermined value.
fifth, sixth, seventh and eighth matched filters, each of the fifth, sixth, seventh and eighth matched filters having a plurality of optical memories;
a third beam splitter located in the path of the second component of the signal beam to split said second component beam into fifth and sixth components and to direct the fifth and sixth component beams onto fifth and sixth paths respectively;
a second multiple beam generating holographic lens having first and second opposite sides; the first side of the second multiple beam generating holographic lens being located in the path of the fifth component beam, wherein the multiple beam generating holographic lens generates a fifth matrix of spatially modulated, individually converging beams focused onto the fifth matched filter, and wherein the multiple beam generating holographic lens generates a sixth matrix of spatially modulated, individually diverging beams; and the second side of the second multiple beam generating holographic lens being located in the path of the sixth component of the signal beam, wherein the second multiple beam generating holographic lens generates a seventh matrix of spatially modulated, individually converging beams focused onto the sixth matched filter, and wherein the multiple beam generating holographic lens generates an eighth matrix of spatially modulated, individually diverging beams; each beam of the fifth matrix being focused on a respective one of the optical memories of the fifth matched filter, and each beam of the seventh matrix being focused on a respective one of the optical memories of the sixth matched filter;
a third correcting optical element located in the path of the fifth matrix of beams to focus each beam out of said fifth matrix onto a respective one of the optical memories of the seventh matched filter;
a fourth correcting optical element located in the path of the eighth matrix of beams to focus each beam of said eighth matrix onto a respective one of the optical memories of the eighth matched filter; and second optical detection means located in the paths of output beams of the fifth, sixth, seventh and eighth matched filters to generate a signal when the correlation between the pattern of one of the beams focused on the fifth, sixth, seventh and eighth matched filters and the optical memory on which said one of the beams is focused, rises above a predetermined value.

10. An optical correlator system according to claim 9, wherein:

the first beam splitter directs the first component beam onto a first axis, and directs the second component beam onto a second axis;

the system further comprises a mirror located on the second axis to reflect the second component beam onto a third axis, parallel to the first axis;

the second beam splitter is located on the first axis; and the third beam splitter is located on the third axis.

11. An optical correlator system according to claim 10, wherein:

each beam of the first matrix is spatially modulated identically to the third component of the signal beam;

each beam of the second matrix is spatially modulated identically to the third component of the signal beam;

each beam of the third matrix is spatially modulated identically to the fourth component of the signal beam;

each beam of the fourth matrix is spatially modulated identically to the fourth component of the signal beam;

each beam of the fifth matrix is spatially modulated identically to the fifth component of the signal beam;

each beam of the sixth matrix is spatially modulated identically to the fifth component of the signal beam;

each beam of the seventh matrix is spatially modulated identically to the sixth component of the signal beam; and each beam of the eighth matrix is spatially modulated identically to the sixth component of the signal beam.

12. An optical correlator system according to claim 11, wherein the image means is located between the means for generating the signal beam and the first beam splitter to spatially modulate the signal beam before the signal beam is split into the first and second components.

* * * * *